No. 610,802. Patented Sept. 13, 1898.
W. J. DYER.
ROLLER CRUSHING MACHINE.
(Application filed Jan. 14, 1897.)
(No Model.)
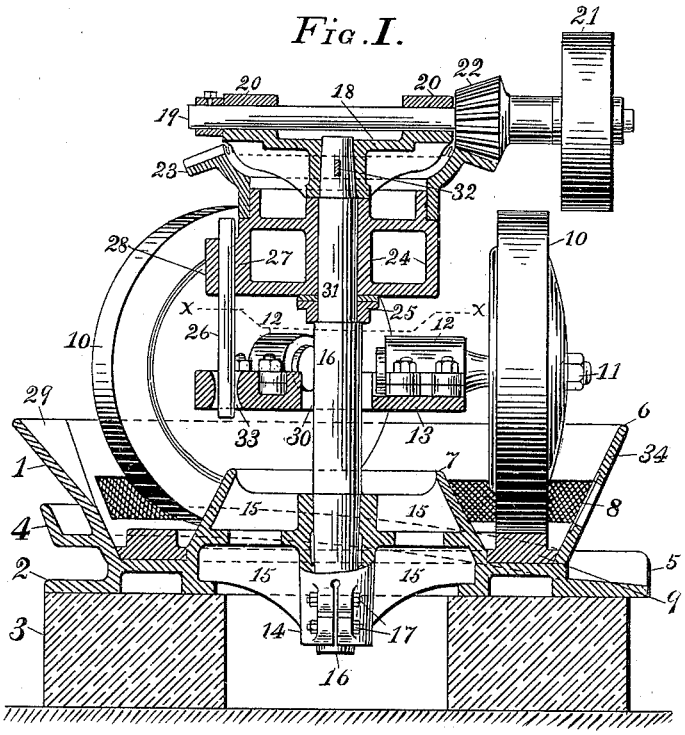
Fig. I.
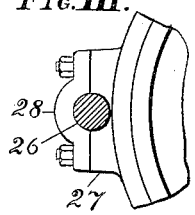
Fig. III.
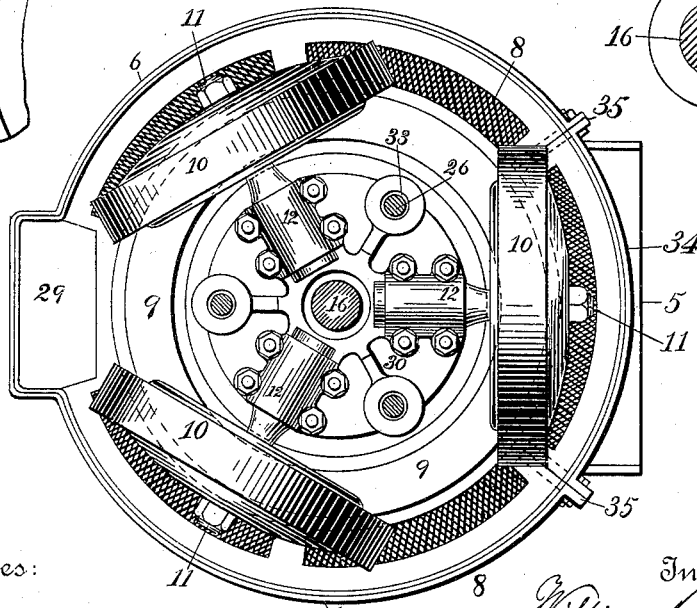
Fig. II.
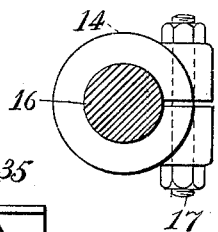
Fig. IV.
Witnesses:
K. Lockwood-Nevins
H. Sanderson.
Inventor:
William J. Dyer
By J. Richards, Atty
THE NORRIS PETERS CO., PHOTO-LITHO., WASHINGTON, D. C.

UNITED STATES PATENT OFFICE.

WILLIAM J. DYER, OF SAN FRANCISCO, CALIFORNIA.

ROLLER CRUSHING-MACHINE.

SPECIFICATION forming part of Letters Patent No. 610,802, dated September 13, 1898.

Application filed January 14, 1897. Serial No. 619,223. (No model.)

*To all whom it may concern:*

Be it known that I, WILLIAM J. DYER, a citizen of the United States, residing in the city and county of San Francisco, State of California, have invented certain new and useful Improvements in Crushing Machinery; and I hereby declare the following specification and the drawings therewith to be a full, clear, and exact description of my improvements.

My invention relates to what are technically called "Chili mills," wherein two or more rollers are caused to revolve or roll on a circular way about a vertical axis.

My improvements consist in constructing such machines with a fixed or non-rotative axis having the required strength and stability to support the driving-gearing thereon from and through the center of rotation or internally in respect to the rollers, thereby constituting the pan that contains the material to be crushed a substructure and supporting element for the whole machine.

My improvements also include a provision for removing the rollers laterally from the machine by constructing the pan with a removable section at the side thereof, through which the rollers can pass without disturbing other parts of the machine.

My improvements further consist in a method of communicating the driving power to the rollers, adjusting the position of the machine in respect to the primary power, and in other features hereinafter referred to, and particularly pointed out in connection with the drawings.

The objects of my invention are to render the machines integral or self-contained, to maintain alinement of all the parts, to render their transportation and erection more convenient, and especially to dispense with a main frame external to or independent of the pan.

Referring to the drawings, Figure I is a central vertical section of a machine made according to my invention. Fig. II is a partial plan view taken on the line *x x* in Fig. I. Fig. III is a top view of one of the bearings in which the driving-stems are mounted, and Fig. IV is a view of the bottom of the shell in which the main central axis is mounted.

The numerals of reference apply to like parts throughout.

The pan or main member 1 is made with a base-flange 2 to rest on a foundation 3, that can be of any suitable kind that will support the weight of the machine. Above the base-flange 2 is a continuous collecting-trough 4, formed around the exterior of the pan 1, sloping to a discharge-spout at 5.

The outer inclined wall 6 of the pan 1 is provided with open spaces filled with screens 8, through which the crushed material when fine enough escapes into the spout 4, and the corresponding inner inclined wall 7 of the pan 1 is made high enough to prevent the material from escaping toward the center.

In the bottom of the pan 1 is placed an annular ring 9, preferably formed in sections and technically called a "die-ring," on which rest the rollers 10. These rollers 10 are made heavy enough to crush ore or other material to be reduced and are mounted on the axes 11, supported in the bearings 12, formed integrally with the member 13, as seen in Figs. I and II.

At one side of the pan 1, preferably over the spout 5, I provide a removable section 34, held by flanges and bolts 35, that when taken out permits removal and replacement of the rollers 10 without disturbing other parts of the machine.

In the center of the pan 1 is formed a strong boss or sleeve 14, braced to the inner wall 7 by the webs 15. This sleeve receives the main central shaft 16, which has a long tapering fit in the sleeve 14 and is clamped when in place by the bolts 17, and can also be fastened by a key if the final position of the pulley 21 is known or has been determined. This main shaft 16 is made strong enough in section to support the top frame 18, on which is mounted the driving-shaft 19, supported in the bearings 20. On this shaft 19 is placed the driving-pulley 21 to receive a band from a steam-engine or other source of power; also, a bevel gear-pinion 22, that meshes into the large bevel-wheel 23, as seen in Fig. I. This bevel-wheel 23 fits on and is fastened to the driving drum or frame 24, which is in effect an extension of the wheel 23, that rests on the collar 25 and turns loosely on its bearing 31 around the main shaft 16.

By making the gear-wheel 23 and the drum 24 each in two lateral halves, so as to be placed on the bearing 31, the top frame 18 can be made integral with the main shaft 16; but the construction shown is preferable.

To communicate motion from the drum 24 to the member 13, I employ studs 26, fastened in the bearings 27 and extending down through the holes 33 in the member 13, the holes 33 being made slightly conical each way, as seen in Fig. I. These studs 26, preferably three in number, or as many as there are of the rollers 10, are made long enough to be adjusted upward or downward or turned to different positions by loosening the caps 28 of the bearings 27.

In crushing ore from which minerals are to be extracted the material is fed through the spout 29 with the required quantity of water and finds its way between the rollers 10 and the die-ring 9 and is crushed to some degree of fineness determined by the screens 8 and is then washed out through these screens and falls into the collecting-trough 4.

As the amount of material between the rollers 10 and the die-ring 9 is variable and as the rollers 10 may have to pass over solid obstructions, the member 13 is at 30 set clear of the main shaft 16 and is free to slide on the driving-stems 26, so the rollers 10 can rise and fall respectively, the member 13 being free to oscillate in any direction. As the die-rings 9 and rollers 10 are worn away this member 13 is free to descend accordingly, the driving-stems 26 being adjusted downward if required. As these stems 26 are subject to abrasive wear where they pass through the member 13, they can be adjusted to new positions, turned around, set up or down, or their ends reversed by loosening or removing the caps 28.

The rollers 10 are confined to their path on the die-ring 9 by the driving-stems 26 and the drum 24, so the main shaft 16 performs no function below the bearing 31 of the drum 24.

The top frame 18 is fastened rigidly on the shaft 16 by a key 32, and in erecting a machine the bolts 17 are loosened and the shaft 16 is turned so the pulley 21 will be in alinement with the driving power, which, as will be seen, can be in any position with respect to the machine. This adjustment can be made before the machine is finally set, after which no further access below the base 2 is required.

It will thus be seen that the main shaft 16 performs all the functions of a usual frame external to the rollers 10 and the pan 1 and that the machine when completed at the works where made is integral and self-contained; also, that no skill is required in its erection and no foundation is required except to support the weight of the machine, such weight being sufficient to withstand the strain of a band or other means of connection to the driving power, and in any case where timber and stone are wanting the machine can be set on a rubble bed or even on solid ground, thus saving the cost of a foundation.

Having now described the nature and objects of my invention, what I claim as new, and desire to secure by Letters Patent, is—

1. In a roller crushing-machine, an annular pan to contain and confine the material to be crushed, a die-ring therein and rollers to revolve thereon, a central main shaft fastened in the center of the pan, and supporting at its top a main gear, and a frame with horizontal bearings carrying a cross-shaft and pinion engaging the main gear for driving the rollers, the whole within the pan's contour, combined and operating substantially as described.

2. In a roller crushing-machine, a pan or base 1, and the central shaft 16 adjustably fastened therein, integral with this shaft or rigidly attached thereto, a top frame 18 forming a support for the shaft 19 and the driving elements thereon, a driving-wheel 23 and drum or frame 24, turning loosely on the shaft and communicating motion to the crushing-rollers, the whole combined and operating substantially as described.

3. In a roller crushing-machine, the combination of the annular pan, the main shaft having the driving-gear supported thereon, gear-wheel 23, drum 24, rollers 10, plate or frame 13, having flaring apertures 33, and the adjustable driving-stems 26, inserted in drum 24 and passing loosely through apertures in plate 13, whereby the latter with the attached rollers is impelled by the rotation of the drum, substantially as specified.

4. In a roller crushing-machine, a main supporting annular pan with flaring or conical inner and outer walls, a section of the said outer wall being detachable, a die-ring, crushing-rollers, and a central detachable shaft, supporting the gearing by which the rollers are revolved, substantially as and for the purpose specified.

In testimony whereof I have hereunto affixed my signature in the presence of two witnesses.

WILLIAM J. DYER.

Witnesses:
K. LOCKWOOD-NEVINS,
H. SANDERSON.